United States Patent
Ishimatsu et al.

(10) Patent No.: US 10,073,327 B2
(45) Date of Patent: Sep. 11, 2018

(54) OPTICAL APPARATUS AND IMAGE PICKUP APPARATUS

(71) Applicant: CANON KABUSHIKI KAISHA, Tokyo (JP)

(72) Inventors: Rie Ishimatsu, Utsunomiya (JP); Kazuhiko Momoki, Koshigaya (JP); Yutaka Yamaguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/466,974

(22) Filed: Mar. 23, 2017

(65) Prior Publication Data

US 2017/0277023 A1 Sep. 28, 2017

(30) Foreign Application Priority Data

Mar. 25, 2016 (JP) .................................. 2016-061520

(51) Int. Cl.
*H04N 9/31* (2006.01)
*G03B 17/56* (2006.01)
*G02B 5/30* (2006.01)
*G02F 1/139* (2006.01)

(52) U.S. Cl.
CPC ......... *G03B 17/565* (2013.01); *G02B 5/3058* (2013.01); *G02B 5/3083* (2013.01); *G02F 1/1393* (2013.01)

(58) Field of Classification Search
CPC .................................................. H04N 9/3167
USPC ........................................................ 348/342
See application file for complete search history.

(56) References Cited

U.S. PATENT DOCUMENTS

| 7,932,952 B2 * | 4/2011 | Murata ................. G02B 5/005 348/360 |
| 9,064,763 B2 | 6/2015 | Ozawa et al. |
| 2009/0079982 A1 | 3/2009 | Lefaudeux |
| 2011/0025965 A1 * | 2/2011 | Yamaguchi .......... H04N 9/3167 349/118 |

FOREIGN PATENT DOCUMENTS

| JP | H05-157513 A | 6/1993 |
| JP | 2005316444 A | 11/2005 |
| JP | 5682437 B2 | 3/2015 |

* cited by examiner

*Primary Examiner* — Joel Fosselman
(74) *Attorney, Agent, or Firm* — Rossi, Kimms & McDowell LLP

(57) ABSTRACT

An optical apparatus includes a first retardation plate giving a retardation between polarization components in slow and fast axis directions, a second retardation plate changing a relative retardation between polarization components in slow and fast axis directions, and a polarizer extracting a polarization component guided to the image pickup element. The first and second retardation plates, and the polarizer are disposed in order from an object side. The slow or fast axis direction of the first retardation plate is parallel to a polarization direction of the polarization component extracted by the polarizer. The slow or fast axis direction of the second retardation plate is inclined by 45 degrees with respect to the polarization direction. When a design wavelength is $\lambda$, a phase change amount being a difference between maximum and minimum values of the relative retardations is in a range from $2\lambda/5$ to $3\lambda/5$ both inclusive.

12 Claims, 13 Drawing Sheets

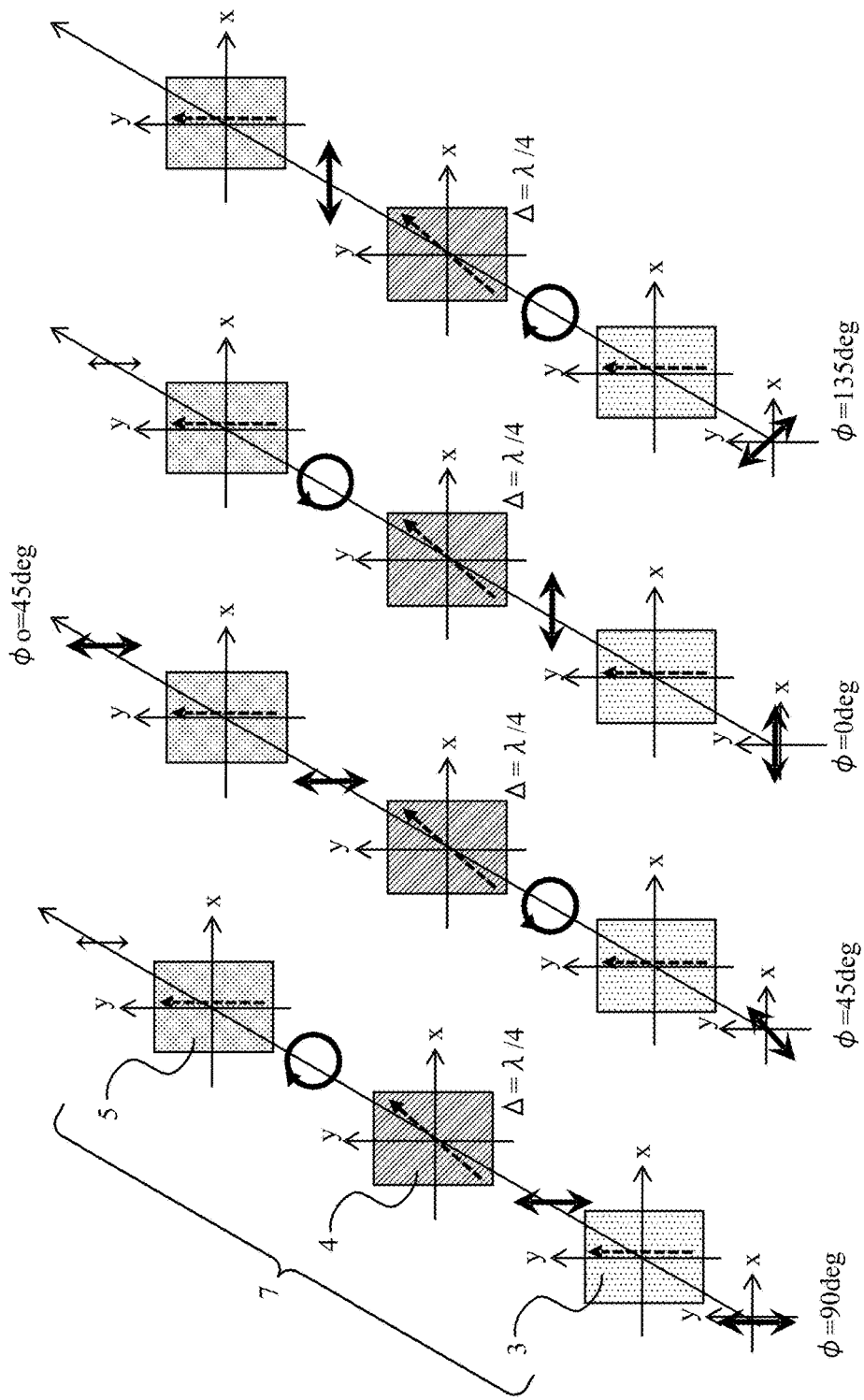

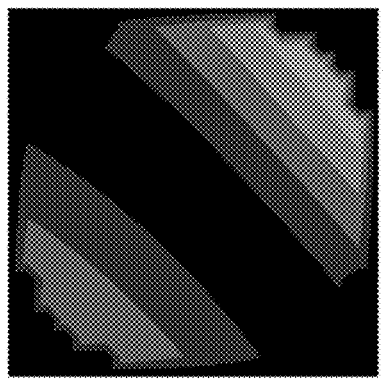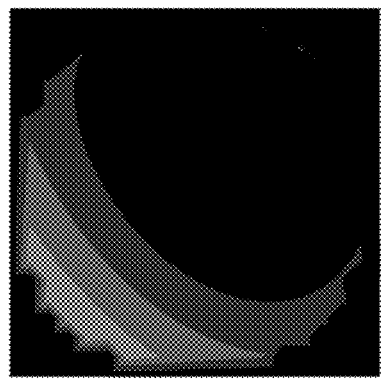
FIG. 11A  FIG. 11B
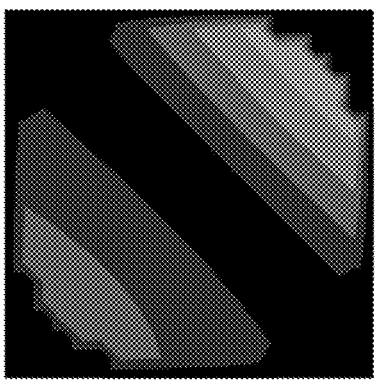
FIG. 11C

OPTICAL APPARATUS AND IMAGE PICKUP APPARATUS

BACKGROUND OF THE INVENTION

Field of the Invention

The present invention relates an optical apparatus and an image pickup apparatus, and more particularly to an optical apparatus capable of obtaining polarization information and an image pickup apparatus having the same.

Description of the Related Art

There is known an image pickup apparatus configured to emphasize and detect a predetermined characteristic of an object by observing a polarization state of light from the object. For example, when images are captured by changing a transmitting polarization direction with a single-lens reflex camera in which a polarization filter is attached to its lens front surface, a highlighting effect of a texture, such as a color and contrast of an object, and a highlighting or reducing effect of an image of reflected light of a water surface etc. can be obtained. Furthermore, there is known an inspection apparatus which detects an edge or a defect portion of an object by capturing images with different polarization directions.

Japanese Patent No. 5,682,437 discloses a configuration of an image pickup element that includes a wire grid polarizer that transmits different polarized light for each pixel on a solid-state image pickup element and extracts polarization information from a plurality of pixels. U.S. Patent Application Publication No. 2009/0079982 discloses a configuration that includes a quarter waveplate, two retardation plates having a variable retardation, and a polarizer, and obtains part of a Stokes parameter by changing an axial direction of each retardation plate and by generating a plurality of images.

However, Japanese Patent No. 5,682,437 requires a plurality of pixels to obtain the polarization information, and the resolution and the color information are lost. U.S. Patent Application Publication No. 2009/0079982 expensively needs two variable retardation plates and a complicated control. Further, if a common digital single-lens reflex camera has an optical low pass filter and an autofocus unit arranged before an image pickup apparatus having polarization dependency, using the configuration disclosed in Japanese Patent No. 5,682,437 or U.S. Patent Application Publication No. 2009/0079982 may not obtain the polarization information of the object appropriately.

SUMMARY OF THE INVENTION

In view of the problem, an object of the present invention is to provide an optical apparatus and an image pickup apparatus, which can obtain polarization information appropriately with a simple structure.

An optical apparatus according to one aspect of the present invention guides light from an object to an image pickup element, and includes a first retardation plate that gives a relative retardation of $\pi/2$ (rad) between a polarization component in a slow axis direction and a polarization component in a fast axis direction, a second retardation plate that includes a liquid crystal layer and that enables changing a relative retardation given between a polarization component in a slow axis direction and a polarization component in a fast axis direction, and a polarizer that extracts a polarization component to be guided to the image pickup element. The first retardation plate, the second retardation plate, and the polarizer are disposed in order from an object side to an image pickup element side. The slow axis direction or the fast axis direction of the first retardation plate is almost parallel to a polarization direction of the polarization component extracted by the polarizer. The slow axis direction or the fast axis direction of the second retardation plate is inclined by almost 45 degrees with respect to the polarization direction of the polarization component extracted by the polarizer. When a design wavelength is $\lambda$ (nm), a phase change amount, which is a difference between a maximum value and a minimum value of the relative retardations given by the second retardation plate, is in a range from $2\lambda/5$ to $3\lambda/5$ both inclusive.

An image pickup apparatus according to one aspect of the present invention an optical apparatus that guides light from an object to an image pickup element, the optical apparatus including a first retardation plate that gives a relative retardation of $\pi/2$ (rad) between a polarization component in a slow axis direction and a polarization component in a fast axis direction, a second retardation plate that includes a liquid crystal layer and that enables changing a relative retardation given between a polarization component in a slow axis direction and a polarization component in a fast axis direction, and a polarizer that extracts a polarization component to be guided to the image pickup element, and a controller that obtains polarization information of the object based on a plurality of images acquired while changing the relative retardation given by the second retardation plate. The first retardation plate, the second retardation plate, and the polarizer are disposed in order from an object side to an image pickup element side. The slow axis direction or the fast axis direction of the first retardation plate is almost parallel to a polarization direction of the polarization component extracted by the polarizer. The slow axis direction or the fast axis direction of the second retardation plate is inclined by almost 45 degrees with respect to the polarization direction of the polarization component extracted by the polarizer. When a design wavelength is $\lambda$ (nm), a phase change amount, which is a difference between a maximum value and a minimum value of the relative retardations given by the second retardation plate, is in a range from $2\lambda/5$ to $3\lambda/5$ both inclusive.

Further features of the present invention will become apparent from the following description of exemplary embodiments with reference to the attached drawings.

BRIEF DESCRIPTION OF THE DRAWINGS

FIGS. 3A to 3D are diagrams illustrating transmittance dependency of a polarization obtainer for a polarization direction of incident light.

FIGS. 11A to 11C are diagrams illustrating distribution of each of errors of polarization information to an incident angle of a polarization obtainer in a first comparative example.

DESCRIPTION OF THE PREFERRED EMBODIMENTS

Figure 1A:
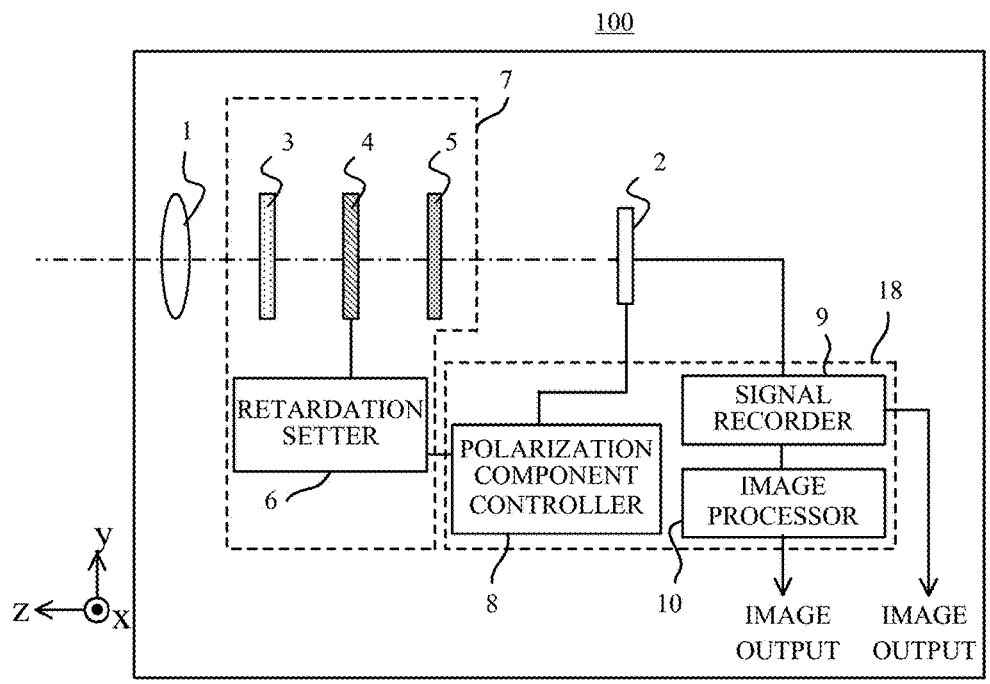
FIGS. 1A to 1C are configuration diagrams of an image pickup apparatus according to a first embodiment.

Referring now to the accompanying drawings, a detailed description will be given of embodiments of the present invention. Those elements in each figure, which are corresponding elements, will be designated by the same reference numerals, and a description thereof will be omitted.

First Embodiment

Figures 1B, 1C:
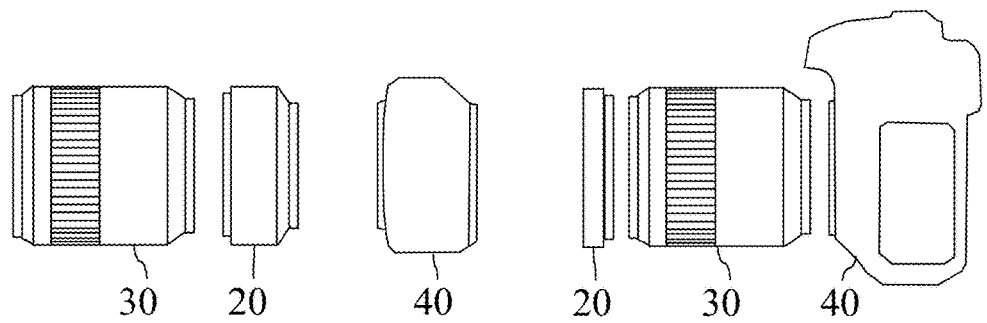

Referring to FIGS. 1A to 1C, a description will be given of a configuration an image pickup apparatus 100 according to this embodiment. FIG. 1A is a schematic diagram of a simplified configuration of the image pickup apparatus 100 according to this embodiment. A z-axis direction in figure represents an optical axis direction of an optical system 1. The image pickup apparatus 100 includes an optical system 1 imaging light from the object on an image pickup element 2, the image pickup element 2 obtaining image information of the object, a polarization obtainer 7 disposed on an optical path between the optical system 1 and the image pickup element 2, and a control unit (controller) 18 being a microcomputer etc. This embodiment disposes the polarization obtainer 7 on the optical path between the optical system 1 and the image pickup element 2, but the present invention is not limited to this embodiment. As long as the polarization obtainer 7 may be disposed on the light incident side (object side) of the image pickup element 2, the polarization obtainer 7 may be disposed on the light incident side of the optical system 1 or among a plurality of optical elements included in the optical system 1. The polarization obtainer 7 is disposed in the image pickup apparatus 100 in this embodiment but may be configured as an adapter 20 as an optical apparatus separate from the image pickup apparatus 100, as illustrated in FIGS. 1B and 1C. The adapter 20 is detachably attached to the lens unit or the digital camera having common mounts, and used for the lens 30 and the digital camera 40 at positions illustrated in FIGS. 1B and 1C when the polarization information is obtained.

The polarization obtainer 7 includes a quarter waveplate (first retardation plate) 3, a variable retardation plate (second retardation plate) 4, a polarizer 5, and a retardation setter 6. Axes of the quarter waveplate 3, the variable retardation plate 4, and the polarizer 5 are arranged on a plane (xy plane) perpendicular to the optical axis of the optical system 1. The quarter waveplate 3 includes an extension film and provides a relative retardation (or relative phase difference) of π/2 (rad) between the polarization components orthogonal to the incident light. The relative retardation of π/2 provided by the quarter waveplate 3 is unchangeable or fixed. This embodiment uses the quarter waveplate, but a third-quarter waveplate or a variable retardation plate may be used as long as it can provide a relative retardation of π/2. The variable retardation plate 4 is an element using a liquid crystal, and provides a relative retardation (referred to as a "retardation of the variable retardation plate 4" hereinafter) between the polarization components orthogonal to the incident light similar to that of the quarter waveplate 3. The retardation of the variable retardation plate 4 can be changed according to the applied voltage. The polarizer 5 transmits a component of the transmission axis direction (transmission polarization direction) among the polarization components of the incident light. Since the polarization obtainer 7 is used for the image pickup apparatus 100, the polarizer 5 preferably use a polarizer of a type absorbing unnecessary light. When the polarizer of a type reflecting the unnecessary light, such as a wire grid polarizer, is used, it reflects the polarized light to be cut and the reflected light becomes stray light and ghost, negatively affecting the image. Thus, the polarizer of the type reflecting the unnecessary light is unsuitable for the configuration of the image pickup apparatus 100. More preferably, in order to suppress the influence of the ghost, the polarizer 5 may characteristically absorb 50% or more of the polarized light that oscillates in the direction orthogonal to the transmission axis over the working wavelength range. This polarizer may include, for example, a film made by extending a resin material containing an iodic compound, but the present invention is not limited to this example and an arbitrary absorption type polarizer may be used. The working wavelength range is a wavelength range in which the image pickup apparatus 100 works, and can be selected by the wavelength characteristic of the image pickup element 2 and application. This embodiment sets the working wavelength range to a visible range (400 nm to 700 nm). The working wavelength range may be at least one of the visible range (400 nm to 700 nm), the near-infrared range (700 nm to 1100 nm), and the near-ultraviolet range (200 nm to 400 nm) based on the configuration of the image pickup apparatus 100. A design wavelength λ (nm) of the variable retardation plate 4 may be selected according to the working wavelength range obtained by the image pickup apparatus 100 so as to maintain the proper characteristic. The retardation setter 6 sets (changes) the retardation of the variable retardation plate 4 according to the signal (command) from the image pickup apparatus 100. This embodiment provides the retardation setter 6 in the polarization obtainer 7, but may provide it in the image pickup apparatus 100 separate from the polarization obtainer 7.

The control unit 18 includes a polarization component controller 8, a signal recorder 9, and an image processor (image processing apparatus) 10, and controls image capturing by the image pickup apparatus 100. The image pickup apparatus 100 fixes the transmission axis direction of the polarizer 5, temporally changes the retardation of the variable retardation plate 4, and captures a plurality of images having different polarization states. The control unit 18 obtains the polarization information of the object based on the plurality of captured images. The polarization component controller 8 outputs a control signal for the retardation of the variable retardation plate 4 to the retardation setter 6 in synchronization with the image pickup element 2. This control changes the polarization component of light from the object which the image pickup element 2 receives, and can acquire an image having the polarization information of the object. The signal recorder 9 temporarily stores a color image acquired from the image pickup element 2 in an unillustrated recording medium, such as a RAM. Each stored image may be output as a plurality of images, or may be output as one or more images after performing predetermined processing by the image processor 10. When the plurality of images are directly output, image processing is further performed on the plurality of images by using an external processing apparatus such as a PC (personal computer) to obtain images which need more complicated calculation or the like. If the signal processor 10 performs processing of extracting a predetermined feature amount, a desired image can be obtained at a high speed.

Figure 2A:
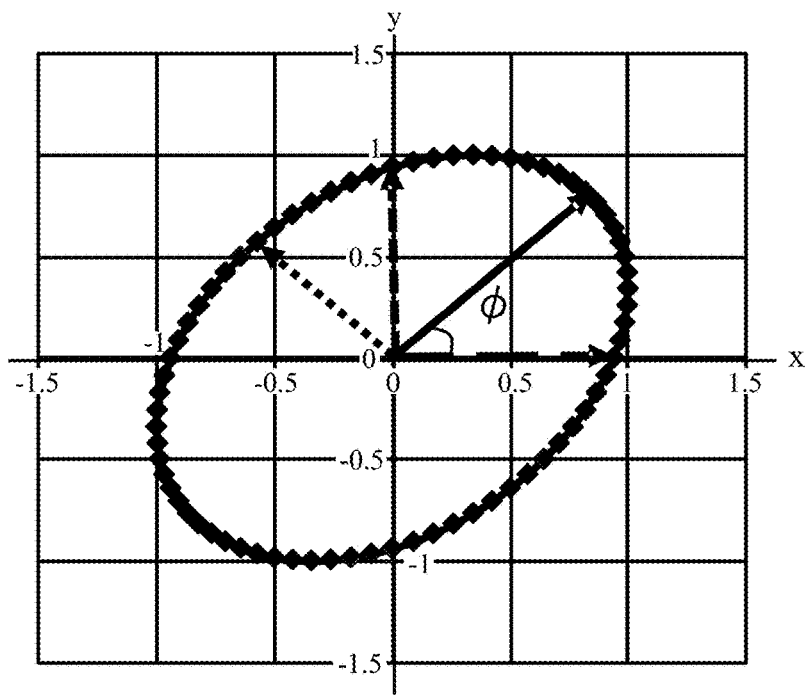
FIGS. 2A and 2B are diagrams illustrating one example of azimuth dependency of a polarization state and a light intensity of incident light.
Figure 2B:
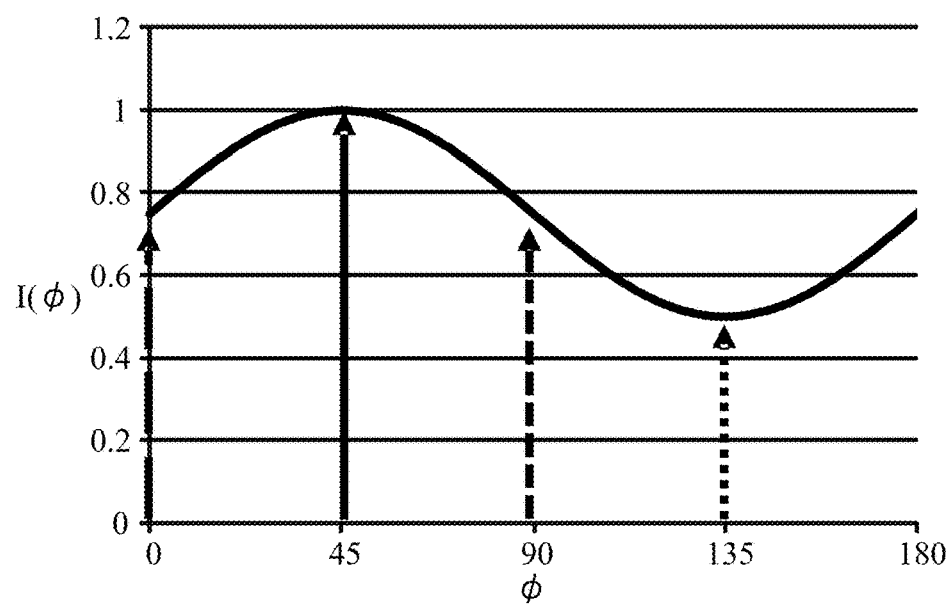

Next, azimuth dependency of a light intensity from a typical object will be described. An ellipse indicated in FIG. 2A illustrates exemplary azimuth dependency of an amplitude of a polarization state. An azimuth angle to an x-axis direction in a polarization direction is denoted by cp (degree). FIG. 2B is a graph in which an abscissa axis indicates the azimuth angle $\varphi$ and an ordinate axis indicates light intensity $I(\varphi)$ corresponding to a square of a radius of the ellipse illustrated in FIG. 2A. Arrows with different line types illustrated in FIG. 2A correspond to arrows with respective line types illustrated in FIG. 2B. In FIGS. 2A and 2B, the light intensity of the polarization component having the azimuth angle $\varphi$ of 45 degrees is maximized. Accordingly, by extracting the polarization component having the angle $\varphi$ of 45 degrees or 135 degrees orthogonal to 45 degrees, an image in which a feature of an object is emphasized most can be acquired.

Referring now to FIGS. 3A to 3D, a description will be given of a behavior of incident light entering the polarization obtainer 7 with a fixed transmitting axis direction of the polarizer 5 and the retardation of the variable retardation plate 4 that is set to be constant. FIGS. 3A to 3D are diagrams illustrating transmittance dependency of the polarization obtainer 7 for the polarization direction of the incident light. FIGS. 3A to 3D set the retardation of the variable retardation plate 4 to λ/4. The arrow direction and length before and after the transmission of the polarization obtainer 7 represent the polarization azimuth and intensity, respectively. A broken-line arrow on each of the quarter waveplate 3 and the variable retardation plate 4 represents the slow axis direction, and a broken-line arrow on the polarizer 5 represents the transmitting axis direction. In other words, each of the slow axis direction of the quarter waveplate 3 and the transmitting axis direction of the polarizer 5 is parallel to the y-axis direction. However, they may not be strictly parallel to the y-axis direction and can be considered substantially parallel (almost parallel) even if they shift from the y-axis direction by several degrees. Each of the slow axis direction of the quarter waveplate 3 and the transmitting axis direction of the polarizer 5 relative to the x-axis direction forms an azimuth angle $\varphi$ of 90 degrees. However, it may not be strictly 90 degrees and considered substantially or almost 90 degrees (almost 90 degrees) even if the azimuth angle shifts by several degrees. The azimuth angle $\varphi$ of the slow axis direction of the variable retardation plate 4 relative to the x-axis is 45 degrees. However, it may not be strictly 45 degrees and considered to be substantially degrees (almost 45 degrees) even if the azimuth angle shifts by several degrees. The fast axis direction of the quarter waveplate 3 and the transmitting axis direction of the polarizer 5 may be parallel to the y-axis direction. In this case, the azimuth angle $\varphi$ of the fast axis direction of the variable retardation plate 4 relative to the x-axis direction is 45 degrees.

FIG. 3A illustrates an incident polarization component with an azimuth angle $\varphi$ of 90 degrees. The incident light transmits through the quarter waveplate 3 without being affected by the phase change, since the polarization direction is parallel to the slow axis direction of the quarter waveplate 3. The light that has transmitted through the quarter waveplate 3 is converted into rightward circularly polarized light by the variable retardation plate 4, and becomes linearly polarized light having an intensity of about 50% of the incident light after transmitting through the polarizer 5.

FIG. 3B illustrates an incident polarization component with an azimuth angle $\varphi$ of 45 degrees. The incident light is converted into leftward circularly polarized light by the quarter waveplate 3. The light that has transmitted through the quarter waveplate 3 is converted into linearly polarized light having an azimuth angle $\varphi$ of 90 degrees in the polarization direction by the variable retardation plate 4 and parallel to the transmitting axis direction of the polarizer 5. Thus, the resultant light transmits through the polarizer 5 with few losses.

FIG. 3C illustrates an incident polarization component with an azimuth angle $\varphi$ of 0 degrees. The incident light transmits through the quarter waveplate 3 without being affected by the phase change, since the polarization direction is orthogonal to the slow axis direction of the quarter waveplate 3. The light that has transmitted through the quarter waveplate 3 is converted into leftward circularly polarized light by the variable retardation plate 4, and becomes linearly polarized light having an intensity of about 50% of the incident light after transmitting through the polarizer 5.

FIG. 3D illustrates an incident polarization component with an azimuth angle $\varphi$ of 135 degrees. The incident light is converted into rightward circularly polarized light by the quarter waveplate 3. The light that has transmitted the quarter waveplate 3 is converted into linearly polarized light having an azimuth angle $\varphi$ of 0 degrees in the polarization direction by the variable retardation plate 4 and orthogonal to the transmitting axis direction of the polarizer 5. Thus, the resultant light rarely transmits through the polarizer 5.

When the retardation of the variable retardation plate 4 is λ/4, the transmittance of the polarization component with the azimuth angle $\varphi$ of 45 degrees becomes maximum in the polarization component of the incident light on the polarization obtainer 7. Hereinafter, $\varphi_0$ (degree) is an angle (maximum transmission angle) of the polarization component relative to the x-axis direction, which provides the maximum transmittance in the polarization component of the incident light on the polarization obtainer 7.

Figure 4:
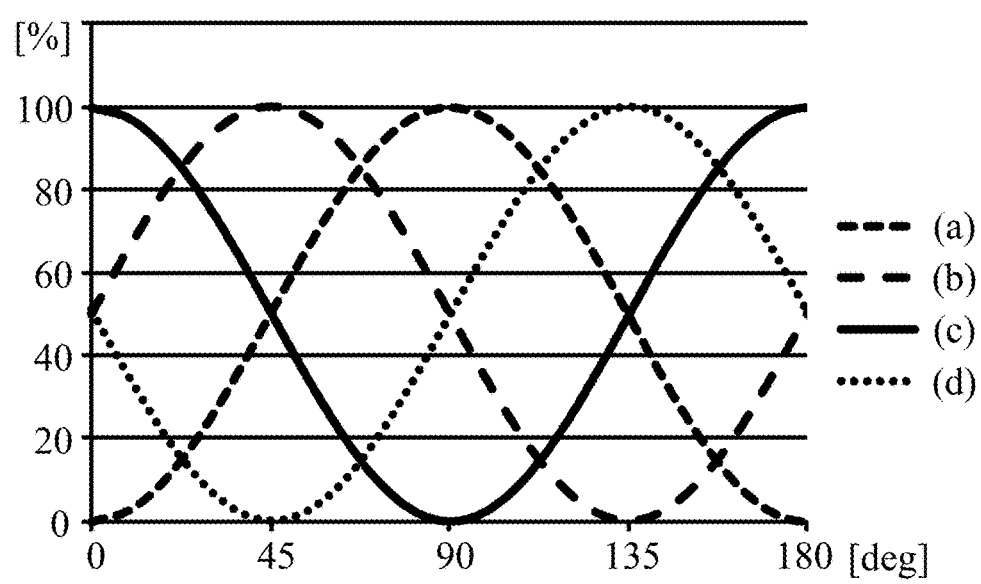
FIG. 4 is a diagram illustrating transmittance dependency of the polarization obtainer to a polarization component of the incident light for each retardation of a variable retardation plate.

FIG. 4 illustrates a relationship between the azimuth angle $\varphi$ of the polarization component of the incident light and the transmittance $T(\varphi)$ of the polarization obtainer 7 for each retardation of the variable retardation plate 4. Lines (a) to (d) in figure represent the retardations of 0, λ/4, λ/2, and 3λ/4 set to the variable retardation plate 4. For example, in the line (a), the transmittance T(φ) is 100% when the azimuth angle φ is 90 degrees, and the maximum transmission angle φ₀ is 90 degrees.

Figures 5A, 5B, 5C, 5D:
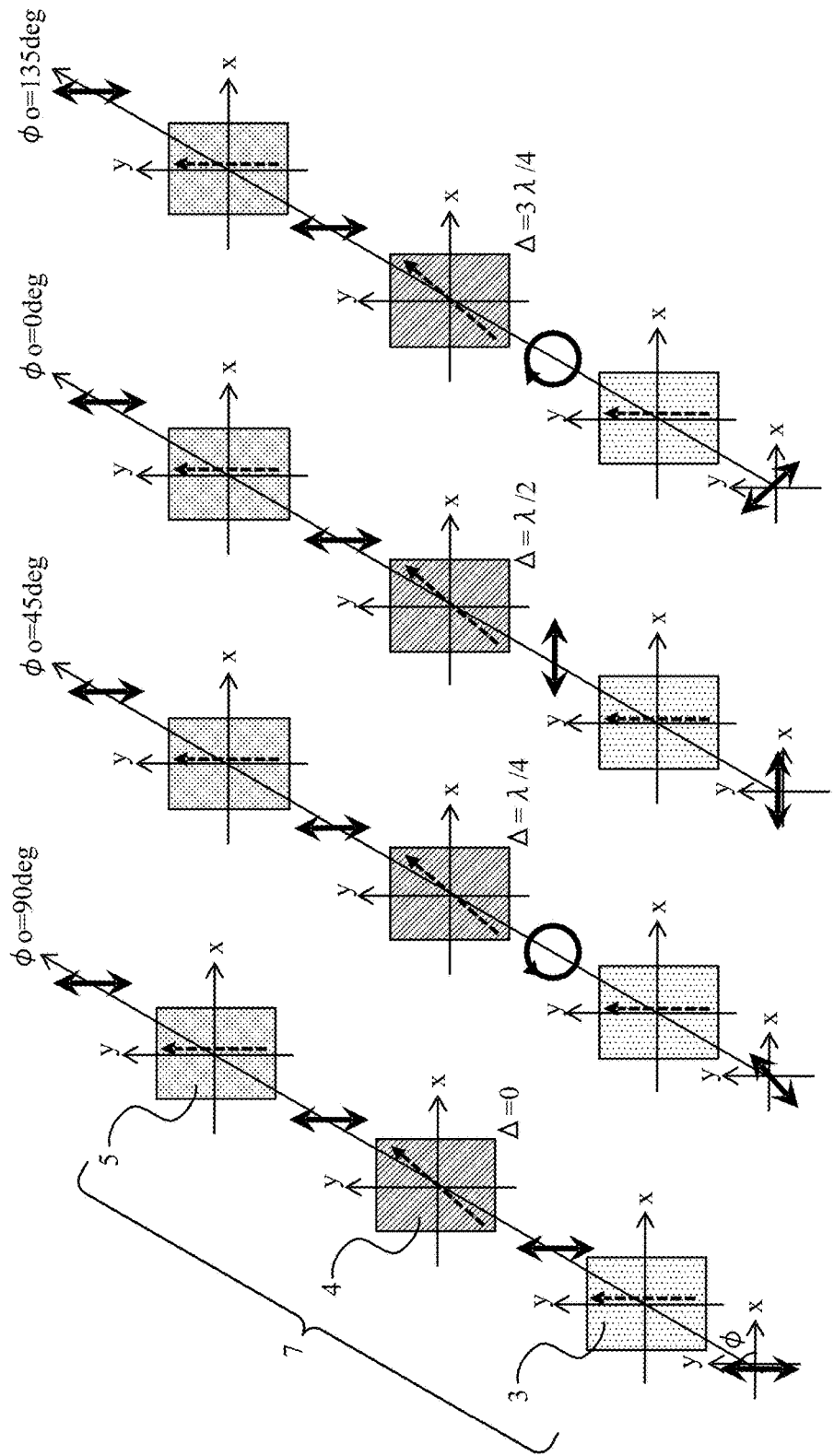
FIGS. 5A to 5D are diagrams illustrating changes of states of a polarization component with a maximum transmission angle corresponding to the retardation of the variable retardation plate.

FIGS. 5A to 5D are diagrams illustrating changes of states of the polarization component with the maximum transmission angle φ₀ corresponding to the retardation of the variable retardation plate 4. A broken-line arrow on each of the quarter waveplate 3 and the variable retardation plate 4 represents the slow axis direction, and a broken-line arrow on the polarizer 5 represents the transmitting axis direction. In FIG. 5A, the retardation of the variable retardation plate 4 is set to 0, and the maximum transmission angle φ₀ is 90 degrees. In FIG. 5B, the retardation of the variable retardation plate 4 is set to λ/4, and the maximum transmission angle φ₀ is 45 degrees. In FIG. 5C, the retardation of the variable retardation plate 4 is set to λ/2, and the maximum transmission angle φ₀ is 0 degrees. In FIG. 5D, the retardation of the variable retardation plate 4 is set to 3λ/4, and the maximum transmission angle φ₀ is 135 degrees.

In other words, in any states in FIGS. 5A to 5D, when the incident light transmits through the quarter waveplate 3 and the variable retardation plate 4, a desired polarization component of the incident light becomes linearly polarized light which is parallel to the transmittance axis direction of the polarizer 5, and it transmits through the polarizer 5 with few losses. Further, the polarization obtainer 7 rotates a direction of the desired polarization component of the polarization components of the incident light to the transmission axis direction of the polarization plate 5, and it guides the desired polarization component to the image pickup element 2 with few losses.

Each of an angle between the slow axes of the λ/4 plate 3 and the variable retardation plate 4 and an angle of the slow axis of the variable retardation plate 4 and the transmission axis of the polarizer 5 is 45 degrees, and thus the influence on the phase information contained in the incident light is minimized. For example, when a complete circularly polarized light enters, it becomes linearly polarized light, which has an azimuth angle of 45 degrees, parallel to the slow axis of the variable retardation plate 4 by the quarter waveplate 3, and the transmittance of the polarization obtainer 7 is constant independently of the retardation of the variable retardation plate 4. For a case of elliptically polarized light, a value according to an azimuth angle dependency of the intensity of the incident polarized light is obtained, and accordingly information on the intensity can be acquired. Each of an angle between the slow axes of the λ/4 plate 3 and the variable retardation plate 4 and an angle of the slow axis of the variable retardation plate 4 and the transmission axis of the polarizer 5 may not be strictly 45 degrees, and can be considered substantially 45 degrees (almost 45 degrees) even if it shifts by several degrees.

In order to obtain the polarization component in which the light intensity of the incident light is maximized, the control unit 18 treats an input value from the image pickup element 2 as the intensity of the polarization component to analyze the azimuth dependency of the light intensity of the incident polarized light by using an appropriate function (for example, Sin function). When the light intensity of the polarization component with the azimuth angle $\varphi_i$ is $I(\varphi_i)$, the transmittance of the polarization obtainer 7 at the retardation Δj(nm) of the variable retardation plate 4 with respect to the light intensity $I(\varphi_i)$ is $T_{ij}$, and the intensity of transmitted light of all polarization components of the incident light at the retardation Δj, the following determinant represented by expression (1) is satisfied.

$$[T_j]=[T_{ij}]*[I(\varphi_i)] \quad (1)$$

A subscript "j" of the intensity $T_j$ of transmitted light corresponds to the retardation Δj, and each retardation corresponds to the polarization component in one direction of the incident light. The transmittance $T_{ij}$ can be obtained uniquely if an oscillation direction of the incident linearly polarized light and the configuration of the polarization obtainer 7 are determined. Accordingly, the control unit 18 acquires the transmittance $T_{ij}$ in advance, and analyzes the intensity $T_j$ of the acquirable transmitted light while changing the retardation Δj as a plot of the intensity of the transmitted light with respect to the oscillation direction of the polarization component of the incident light to obtain the azimuth dependency of the light intensity of the incident light.

With such a method, the image pickup apparatus 100 can obtain information of the azimuth dependency of the light intensity by electrically driving the variable retardation plate 4 without rotating the elements.

Figure 6:
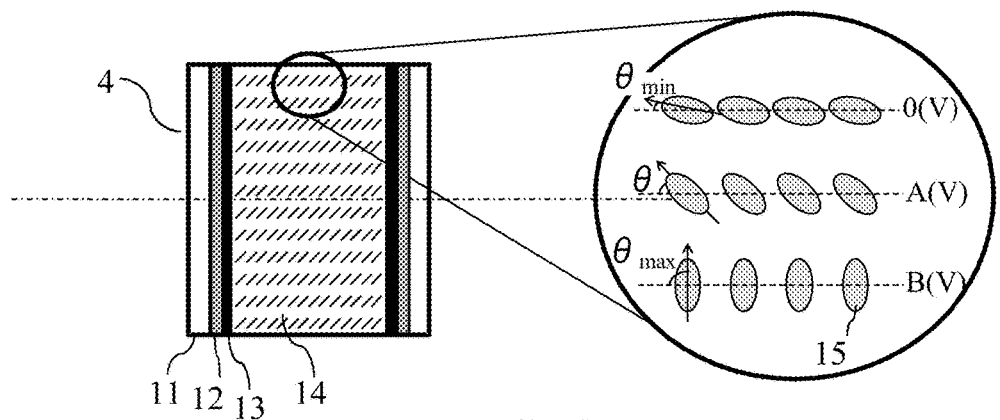
FIG. 6 is a configuration diagram of the variable retardation plate.

Referring now to FIG. 6, a description will be given of a configuration of the variable retardation plate 4. FIG. 6 is a configuration diagram of the variable retardation plate 4, and a circle in figure enlarges the liquid crystal layer. The variable retardation plate 4 includes substrates 11, electrode layers 12, alignment films 13, and a liquid crystal layer 14 held by the substrates 11, the electrode layers 12, and the alignment films 13. The liquid crystal layer 14 is a VA type liquid crystal layer (VA liquid crystal layer), and liquid crystal molecules 15 follow the alignment film 13. When the applied voltage is changed in order from 0 [V] to A [V] and B (>A) [V], the tilt angle of the liquid crystal molecule 15 changes from a minimum value $\theta_{min}$ to a maximum value $\theta_{max}$ through an intermediate value θ. The retardation setter 6 applies the voltage to the variable retardation plate 4, controls the tilt angle θ of the liquid crystal molecule 15 or the refractive index anisotropy, and changes the retardation of the variable retardation plate 4.

Assuming that a maximum retardation $\Delta_{max}$ (nm) is a retardation when the tilt angle is $\theta_{max}$ and a minimum retardation $\Delta_{min}$ (nm) is a retardation when the tilt angle is $\theta_{min}$, a phase change amount is expressed by a difference between the maximum retardation $\Delta_{max}$ and the minimum retardation $\Delta_{min}$. The retardation of the variable retardation plate 4 is variable in a range from the minimum retardation $\Delta_{min}$ to the maximum retardation $\Delta_{max}$ both inclusive, but the retardation preferably contains the maximum retardation and the minimum retardation in light of the driving speed and angle characteristics of the variable retardation plate 4. Thus, two or more retardations at measurement are set, preferably containing either of the maximum retardation and the minimum retardation. In addition, the retardation more preferably contains both the minimum retardation and the maximum retardation. The phase change amount also depends on the thickness of the liquid crystal layer 14. Even if the tilt angels $\theta_{max}$, $\theta_{min}$ and the refractive index anisotropy of the liquid crystal molecule 15 are constant, the phase change amount increases with enlarging the thickness of the liquid crystal layer 14. Increasing the phase change amount reduces the angle characteristics of the polarization obtainer 7.

Here, an appropriate value of the phase change amount will be explained. In the above explanation, the minimum retardation $\Delta_{min}$ is 0 and the maximum retardation $\Delta_{max}$ is 3λ/4, that is, the phase change amount is 3λ/4, but, in this embodiment, the phase change amount is set in a range from 2λ/5 to 3λ/5 both inclusive. In other words, the phase change amount Δ satisfies a condition of 2λ/5≤Δ≤3λ/5. When the phase change amount is large, the thickness of the liquid crystal layer 14 enlarges, and the angle characteristics of the polarization obtainer 7 lowers. Accordingly, in light of the angle characteristics of the polarization obtainer 7, the phase change amount is preferably less than or equal to 3λ/5. However, the phase change amount may not be strictly less than or equal to 3λ/5, and may be less than or equal to 3λ/5±λ/10. Meanwhile, when the phase change amount is small, the variable amount of the azimuth angle φ decreases. If the variable range of the azimuth angle $φ_s$ decreases, the measurement error has a significant influence on the fitting accuracy, and thus the accuracy of the acquirable polarization information lowers. Accordingly, in light of the variable range of the azimuth angle φ, the phase change amount is preferably more than or equal to 2λ/5. However, the phase change amount may not be strictly more than or equal to 2λ/5, and may be more than or equal to 2λ/5±λ/10.

In this embodiment, setting the phase change amount of the variable retardation phase 4 in the range from 2λ/5 to 3λ/5 both inclusive can obtain the polarization information with high accuracy without lowering the angle characteristics of the polarization obtainer 7. However, the phase change amount is more preferably in a range from 9λ/20 to 11λ/20 both inclusive, even more preferably in a range from 19λ/40 to 21λ/40 both inclusive. Moreover, setting the phase change amount of the variable retardation plate 4 to λ/2 can realize an effect of the present invention. However, the phase change amount may not be strictly λ/2, and considered to be substantially λ/2 (almost λ/2) as long as it is in a range of λ/2±λ/10.

The present invention may use, but is not limited to, the VA liquid crystal. For example, the present invention can use a variety liquid crystals, such as the TN liquid crystal and the OCB liquid crystal. Furthermore, when the retardation has wavelength dispersion, the retardation at the design wavelength should satisfy the above condition of the phase change amount. The design wavelength is arbitrary settable in the working wavelength range. For example, when the working wavelength is the visible range (400 nm to 700 nm), the design wavelength is set as 550 nm, and the above condition of the phase change amount should be satisfied with respect to light of 550 nm.

While each of the images obtained by the image pickup apparatus 100 contains different polarization information, it can be used directly without performing calculation processing such as image processing. Moreover, by performing the calculation processing on the images containing the different polarization information, images in which the feature of the object is more emphasized for each pixel unit can be obtained. For example, by generating an image only with smallest values of the light intensity in the acquired data or by generating an image only with largest values of the light intensity, the image in which a scattered light component of the object is emphasized or the image in which a regular reflection component from the object is emphasized can be obtained. The value of the light intensity of the polarized light may be a value of an image directly obtained by the polarization obtainer 7, or alternatively a value of interpolation or extrapolation obtained by a polarization analysis may be used. The interpolation or extrapolation means using an estimated value based on an analysis result so that a difference of the intensities of the obtained polarization components is emphasized or suppressed.

As described above, by acquiring object information (information of the object) optically, the image in which a feature amount of the object is emphasized or suppressed can be obtained. Furthermore, by a combination of them, an image which is intended by a user can be generated. In addition, an image containing different polarization information for each region in the image or containing an emphasis effect may be generated. For example, by combining images with different polarization states for a main object and a background (for example, a sky), an effect of equalizing colors in the background or an effect of acquiring an image in which each of the background and the main object is emphasized can be obtained. In addition, by performing various processing using the intensity dependency of the polarized light for the object, an intended image can be obtained.

Hereinafter, a description will be given of a configuration of this embodiment using specific data. With respect to the retardation of the quarter waveplate 3 or the variable retardation plate 4, a wavelength λ is a wavelength of 550 nm that has a high visibility. The variable retardation plate 4 provides three retardations Δ (=0, λ/4, λ/2) (nm), and the phase change amount is λ/2. Table 1 represents the transmittance for each linearly polarized light, which has a different oscillation direction, corresponding to each retardation of the variable retardation plate 4, i.e., the transmittance $[T_{ij}]$ in expression (1). Symbol $φ_i$ (degree) in Table 1 represents an angle of the oscillation direction of the polarized incident light with respect to the x-axis direction, and a numerical value is a value near a center of an image display element, being obtained as an average value of polarization characteristics of the incident light flux having an incident angle of 15 degrees. The maximum transmission angle $φ_0$ for each retardation is indicated at the bottom line in Table 1. For example, the polarization states of the light transmitted through the variable retardation plate 4 with the retardation Δ of λ/4 are as illustrated in FIGS. 3A to 3D. Thus, the highest transmittance is obtained at the angle $φ_i$ of 45 degrees, and the minimum transmittance is obtained at the angle $φ_i$ of 135 degrees orthogonal to 45 degrees. The relationship between the maximum transmission angle $φ_0$ and the retardation ψ (degree) can be represented as $φ_0=ψ/2+90$. For other wavelengths, the maximum transmission angle $φ_0$ changes depending on wavelength dispersion of the variable retardation plate 4, but if dispersion characteristics of the variable retardation plate 4 are known, the maximum transmission angle $φ_0$ can be obtained for arbitrary wavelengths.

A description will be given of a method of estimating the azimuth dependency of the light intensity of the incident polarized light as an example of a case in which the light of the polarization component illustrated in FIGS. 2A and 2B is incident.

First, as can be seen in FIG. 2B, the intensities of the polarized lights for the respective azimuth angle φ are read as I(0)=0.75, I(45)=1.0, and I(90)=0.75. According to expression (1), by multiplying the intensity $[I(φ_j)]$ of each of the three polarized incident lights by the transmittance $[T_{ij}]$ in Table 1, $[T_j]$ is obtained as T(j=0, Δ=0)=1.500, T(j=1, Δ=λ/4)=1.746, and T(j=2, Δ=λ/2)=1.500. By normalizing them with the maximum value, T'(j=0)=0.859, T'(j=1)=1.000, and T'(j=2)=0.861.

Figure 7A:
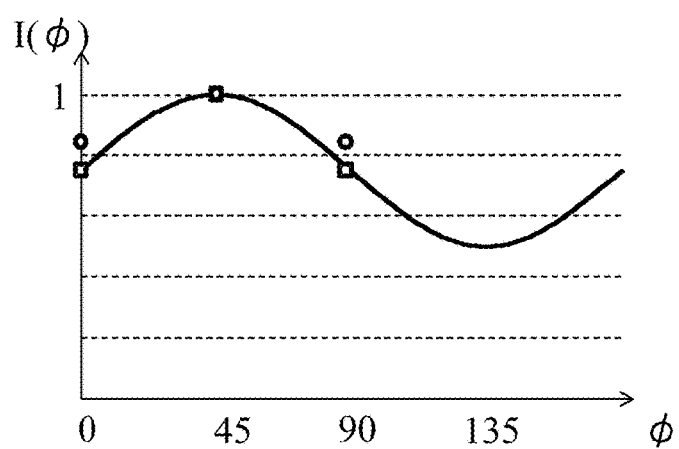
FIGS. 7A and 7B are diagrams illustrating light intensity dependency of the polarization component of the polarization obtainer.
Figure 7B:
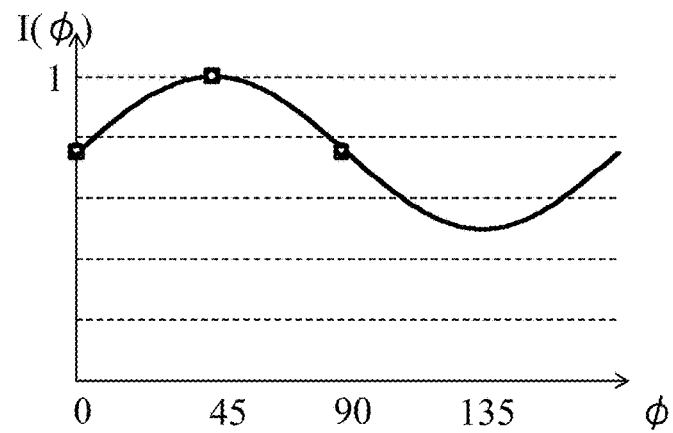

Maximum transmission angle $φ_0$ for j=0, 1, and 2 are 90, 45, and 0 degrees, respectively, and accordingly a graph in which j is replaced with $φ_0$ and a normalized intensity $T'(φ_0)$ of the transmitted light is plotted on the intensity I(φ) of the incident polarized light is illustrated in FIG. 7A. Plots of symbol "□" indicate light intensities obtained when the transmission axis direction of the polarizer 5 is the maximum transmission angle $φ_0$, and plots of symbol "o" indicate light intensities obtained by the polarization obtainer 7. According to the data, the azimuth angel of the polarization component in which the light intensity is maximized can be obtained as 45 degrees based on fitting of A, B, and $\varphi_0$ in $I(\varphi)=A+B*Sin(\varphi+\varphi_0)$ using a least square method or the like. However, the plots "○" contain a lot of offsets compared to the light intensity. The offsets are caused by a decrease of an extinction ratio in the process of acquiring the polarization information, and for example, it can be simply canceled to some extent by subtracting a minimum value of the normalized transmittance T' from $T(\varphi)$ and then normalizing it again. FIG. 7B illustrates a graph which is similar to that of FIG. 7A after this process is performed. Each plot in FIG. 7B conforms to that in FIG. 7A. As can be seen in FIG. 7B, data in which plots of the incident intensities are reflected, compared to data in FIG. 7A, are obtained.

TABLE 1

|  | $\Delta = 0\lambda$ | $\Delta = \frac{1}{4}\lambda$ | $\Delta = \frac{1}{2}\lambda$ |
|---|---|---|---|
| $\varphi i = 0$ | 0.0000 | 0.4971 | 1.0000 |
| $\varphi i = 45$ | 0.5000 | 1.0000 | 0.5057 |
| $\varphi i = 90$ | 1.0000 | 0.4971 | 0.0000 |
| MAXIMUM TRANSMISSION AZIMUTH | $\varphi = 90$ | $\varphi = 45$ | $\varphi = 0$ |

Figure 8:
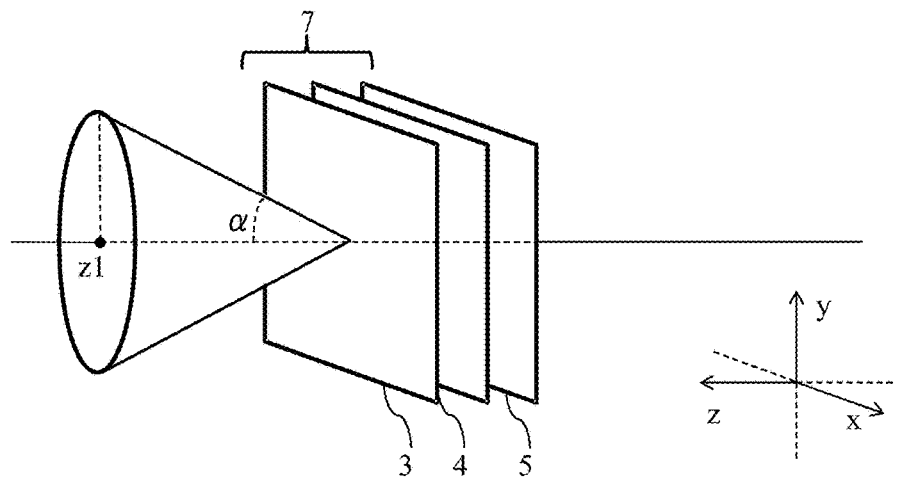
FIG. 8 is a schematic diagram illustrating an incident light flux.
Figure 9A:
FIGS. 9A to 9D are diagrams illustrating light intensity distribution of transmitted light to an incident angle.
Figure 9B:
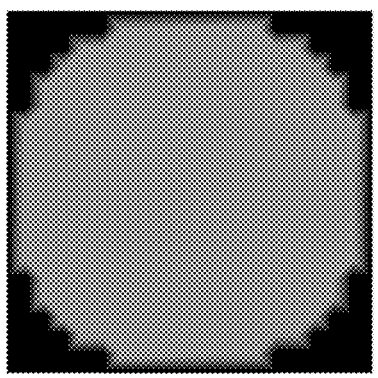
Figure 9C:
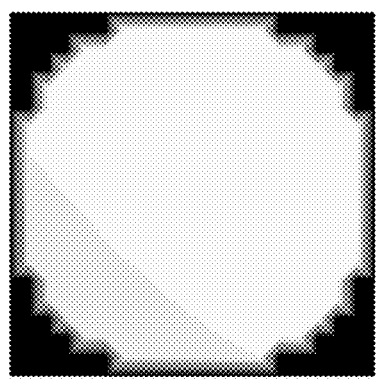
Figure 9D:
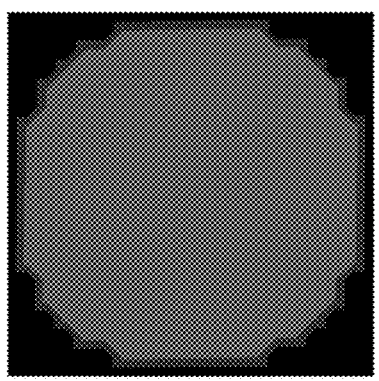
Figure 10A:
FIGS. 10A to 10C are diagrams illustrating distribution of each of errors of polarization information to an incident angle of the polarization obtainer in the first embodiment.
Figure 10B:
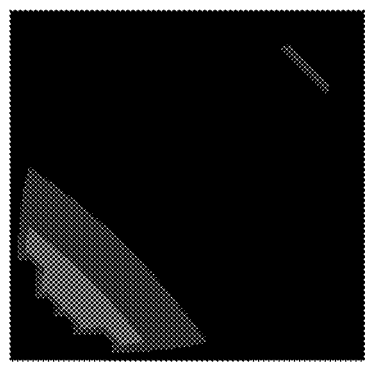
Figure 10C:

Next, a description will be given of a case in which a light flux having a spread is incident on the polarization obtainer 7. FIG. 8 is a schematic diagram illustrating an incident light flux. FIGS. 9A to 9D are diagrams illustrating light intensity distribution of transmitted light to an incident angle calculated by simulation when a light flux spread with an outermost incident angle α illustrated in FIGS. 10A to 10C is incident on the polarization obtainer 7. In the simulation, the polarization states of the incident light is the linear polarized light in which the azimuth angle is 45 degrees, and the maximum intensity is 1, that is, Ai, Bi, $\varphi_0$i, and the angle α are respectively 0, 1, 45 degrees, and 15 degrees. Moreover, the minimum tilt angle $\theta_{mi}$, the maximum tilt angle $\theta_{max}$, the refractive index anisotropy $|n_e-n_o|$ of the liquid crystal, and the thickness d of the liquid crystal layer are respectively 0°, 90°, 0.085, and 3.2 μm. FIGS. 9A to 9D illustrates views of the light flux at the position z1 in FIG. 8 when viewed from an incident side. FIG. 9A illustrates the incident light flux used in the simulation. FIGS. 9B to 9D illustrates the transmitted light intensity distribution where the retardation of the variable retardation plate 4 are 0, λ/4, and λ/2, respectively. As illustrated in FIGS. 9B to 9D, in this embodiment where the phase change amount of the variable retardation plate 4 is λ/2, almost uniform transmitted light intensity distribution can be obtained independently of the incident angle.

Next, the distribution of the polarization information A, B, and $\varphi_0$ is calculated based on fitting using the obtained transmitted light intensity distribution. FIGS. 10A to 10C are respectively diagrams illustrating distribution of each of absolute errors (|A–Ai|, |B–Bi|, and |$\varphi$–$\varphi_0$i|) between the calculated polarization information (A, B, and $\varphi_0$) and the polarization information of the incident light (Ai(=0), Bi(=1), and $\varphi_0$i (=45 degrees)). As illustrated in FIGS. 10A to 10C, it is calculated that the absolute error of the polarization information A and B is less than 0.15, and the absolute error of the polarization information $\varphi_0$ is less than 5 degrees.

Hereinafter, comparative examples will be explained to clarify the incident angle dependency, the phase change amount of the variable retardation plate 4, and the retardation at measurement.

First Comparative Example

In this comparative example, image capturing is performed on condition that the phase change amount of the retardation plate 4 is 3λ/4, and four retardations Δ are respectively 0, λ/4, λ/2, and 3λ/4. Moreover, the thickness d of the liquid crystal layer 14 is 4.9 μm, and the other configurations are the same as that of the first embodiment. FIGS. 11A to 11C are diagrams illustrating distribution of each of absolute errors (|A–Ai|, |B–Bi|, and |$\varphi$–$\varphi_0$i|) calculated by simulation of this comparative example. According to FIGS. 10A to 10C, and FIGS. 11A to 11C, influence due to the incident angle when obtaining the polarization information in this comparative example is larger than that in the first embodiment.

Second Comparative Example

Figure 12A:
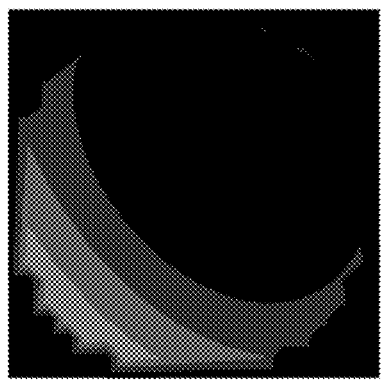
FIGS. 12A to 12C are diagrams illustrating distribution of each of errors of polarization information to an incident angle of a polarization obtainer in a second comparative example.
Figure 12B:
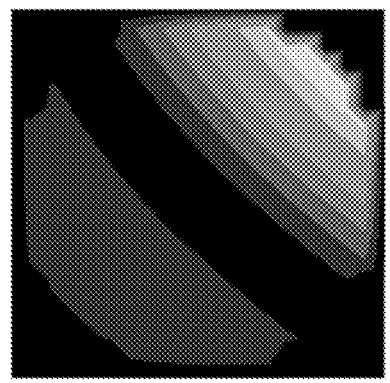
Figure 12C:
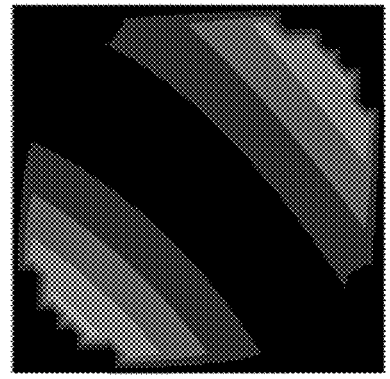

In this comparative example, image capturing is performed on condition that the phase change amount of the retardation plate 4 is 3λ/4, and three retardations Δ are respectively 0, λ/4, and λ/2. Moreover, the thickness d of the liquid crystal layer 14 is 4.9 μm, and the other configurations are the same as that of the first embodiment. FIGS. 12A to 12C are diagrams illustrating distribution of each of absolute errors (|A–Ai|, |B–Bi|, and |$\varphi$–$\varphi_0$i|) calculated by simulation of this comparative example. According to FIGS. 10A to 10C, and FIGS. 12A to 12C, influence due to the incident angle when obtaining the polarization information in this comparative example is larger than that in the first embodiment.

Third Comparative Example

Figure 13A:
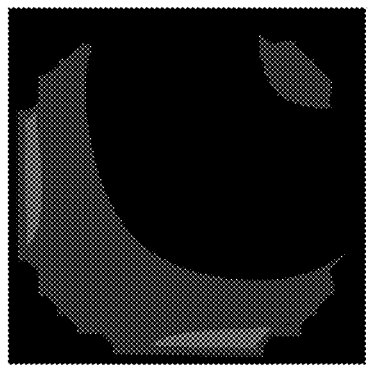
FIGS. 13A to 13C are diagrams illustrating distribution of each of errors of polarization information to an incident angle of a polarization obtainer in a third comparative example.
Figure 13B:
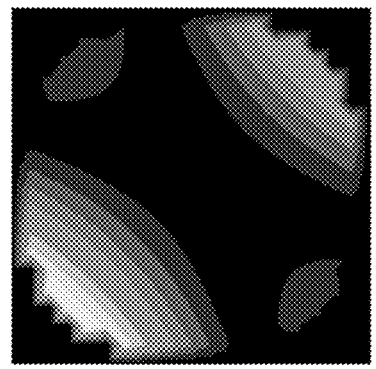
Figure 13C:
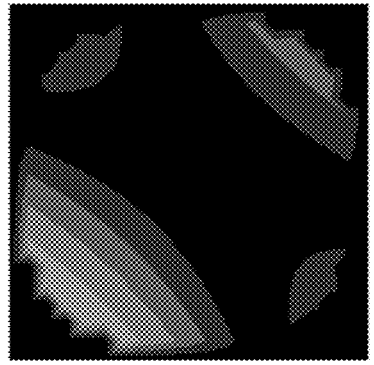

In this comparative example, image capturing is performed on condition that the phase change amount of the retardation plate 4 is 3λ/4, and three retardations Δ are respectively 0, λ/4, and 3λ/4. Moreover, the thickness d of the liquid crystal layer 14 is 4.9 μm, and the other configurations are the same as that of the first embodiment. FIGS. 13A to 13C are diagrams illustrating distribution of each of absolute errors (|A–Ai|, |B–Bi|, and |$\varphi$–$\varphi_0$i|) calculated by simulation of this comparative example. According to FIGS. 10A to 10C, and FIGS. 13A to 13C, influence due to the incident angle when obtaining the polarization information in this comparative example is larger than that in the first embodiment.

As mentioned above, when the phase change amount increases as the first to third comparative examples, the error of the polarization information obtained independently of the retardation amount at measurement and the number of measurements becomes large. Thus, the phase change amount is preferably smaller than 3λ/5.

Fourth Comparative Example

Figure 14A:
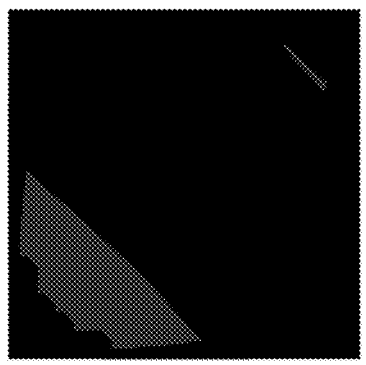
FIGS. 14A to 14C are diagrams illustrating distribution of each of errors of polarization information to an incident angle of a polarization obtainer in a fourth comparative example.
Figure 14B:
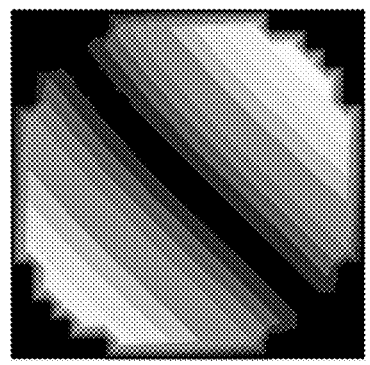
Figure 14C:
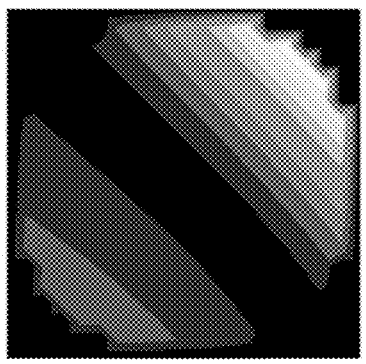

In this comparative example, image capturing is performed on condition that the phase change amount of the retardation plate 4 is 3λ/4, and three retardations Δ are respectively 0, λ/8, and λ/4. Moreover, the thickness d of the liquid crystal layer 14 is 1.6 μm, and the other configurations are the same as that of the first embodiment. FIGS. 14A to 14C are diagrams illustrating distribution of each of absolute errors ($|A-Ai|$, $|B-Bi|$, and $|\varphi-\varphi_0 i|$) calculated by simulation of this comparative example. According to FIGS. 10A to 10C, and FIGS. 14A to 14C, influence due to the incident angle when obtaining the polarization information in this comparative example is larger than that in the first embodiment. As mentioned above, when the retardation becomes too small, the error of the polarization information becomes large. Thus, the phase change amount is preferably larger than $2\lambda/5$.

Second Embodiment

This embodiment describes an image pickup apparatus 200 that can handle the negative influence when an optical low-pass filter etc. is arranged. A description of a configuration common to that of the first embodiment will be omitted.

In general, an optical low-pass filter is disposed near the image pickup element so as to prevent moiré and false color in an image pickup apparatus, such as a digital single-lens reflex camera. The polarization information of the object may not be correctly acquired even with the configuration in the first embodiment, if the optical low-pass filter disposed in front of the image pickup element 2 or the autofocus unit depends on the polarization. In addition, when the polarization obtainer 7 is simply disposed between the optical low-pass filter and the lens, the optical low-pass filter may not maintain the intended effect due to the influence of the polarization obtainer 7.

Figure 15:
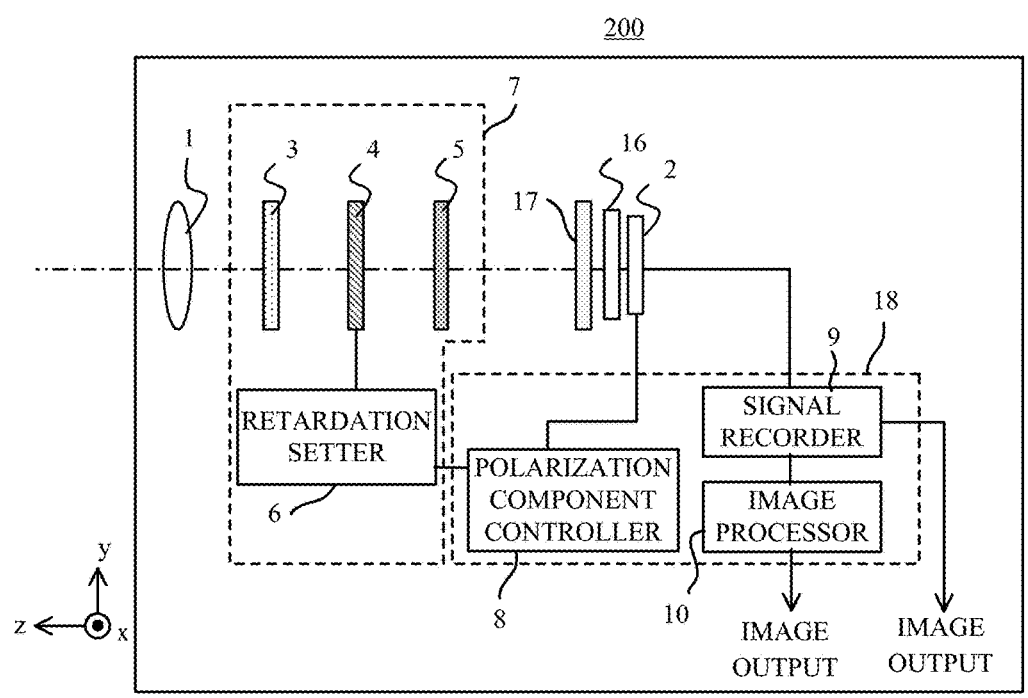
FIG. 15 is a configuration diagram of an image pickup apparatus according to a second embodiment.

FIG. 15 is a schematic diagram of the image pickup apparatus 200 including an optical low-pass filter 17. The optical low-pass filter 17 can use a component using a polarization characteristic, such as a component in which a plurality of layers made of a birefringent medium are laminated and a polarization diffraction element.

As a solution for the above problem that occurs when the optical low-pass filter etc. is disposed, the second embodiment insets an achromatic quarter waveplate 16 (achromatic retardation plate, third retardation plate) into a space between a polarizer 5 and the optical low-pass filter 17 so as to convert the light into circularly polarized light. Although a usual quarter waveplate may be inserted, the quarter waveplate has a wavelength dispersion and does not provide uniformly circularly polarized light over the working wavelength range. Thus, a phase shift caused by the wavelength may appear as a color change in the image. Accordingly, a quarter waveplate to be inserted is preferably an achromatic quarter waveplate in which a retardation is designed to be minimum in the working wavelength range, such as a visible wavelength range. An alternative measure is to set an angle between a light separation direction of a layer in the optical low-pass filter 17 closest to the polarization obtainer 7 (in case of the lamination structure) and a transmitting axis direction of the polarizer 5 to 45 degrees. Even in this case, the characteristic of the optical low-pass filter and the characteristic of the polarization obtainer 7 can be reconciled. The latter measure is simpler although any one of the countermeasures can be used.

Since the working wavelength range of the general image pickup apparatus is almost the visible range (400 to 700 nm), $\lambda$ in the retardation of the variable retardation plate 4 may be a wavelength contained in the visible range, such as a central wavelength of 550 nm. When the working wavelength range for the image pickup apparatus is the infrared range (700 nm to 1100 nm), $\lambda$ may be a wavelength in the infrared range, such as a wavelength of 900 nm. When the working wavelength range for the image pickup apparatus contains both wavelength ranges, $\lambda$ may be a wavelength in the visible or infrared range, such as a wavelength of 750 nm.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-061520, filed on Mar. 25, 2016, which is hereby incorporated by reference herein in its entirety.

What is claimed is:

1. An optical apparatus that guides light from an object to an image pickup element, the optical apparatus comprising:
    a first retardation plate that gives a relative retardation of $\pi/2$ (rad) between a polarization component in a slow axis direction and a polarization component in a fast axis direction;
    a second retardation plate that includes a liquid crystal layer and that enables changing a relative retardation given between a polarization component in a slow axis direction and a polarization component in a fast axis direction; and
    a polarizer that extracts a polarization component to be guided to the image pickup element;
    wherein the first retardation plate, the second retardation plate, and the polarizer are disposed in order from an object side to an image pickup element side,
    wherein the slow axis direction or the fast axis direction of the first retardation plate is almost parallel to a polarization direction of the polarization component extracted by the polarizer,
    wherein the slow axis direction or the fast axis direction of the second retardation plate is inclined by almost 45 degrees with respect to the polarization direction of the polarization component extracted by the polarizer, and
    wherein, when a design wavelength is $\lambda$ (nm), a phase change amount, which is a difference between a maximum value and a minimum value of the relative retardations given by the second retardation plate, is in a range from $2\lambda/5$ to $3\lambda/5$ both inclusive.

2. The optical apparatus according to claim 1, wherein the phase change amount is $\lambda/2$.

3. The optical apparatus according to claim 1, wherein the design wavelength is 550 nm.

4. The optical apparatus according to claim 1, further comprising a setter that changes a voltage applied to the second retardation plate to set the relative retardation given by the second retardation plate.

5. The optical apparatus according to claim 1, wherein the liquid crystal layer is a VA type liquid crystal layer.

6. The optical apparatus according to claim 1, wherein the polarizer absorbs 50% or more of a polarization component in a direction orthogonal to the polarization direction of the polarization component extracted by the polarizer over a working wavelength range.

7. An image pickup apparatus comprising:
    an optical apparatus that guides light from an object to an image pickup element, the optical apparatus including a first retardation plate that gives a relative retardation of $\pi/2$ (rad) between a polarization component in a slow axis direction and a polarization component in a fast axis direction, a second retardation plate that includes a liquid crystal layer and that enables changing a relative retardation given between a polarization component in a slow axis direction and a polarization component in a fast axis direction, and a polarizer that extracts a polarization component to be guided to the image pickup element; and a controller that obtains polarization information of the object based on a plurality of images acquired while changing the relative retardation given by the second retardation plate, wherein the first retardation plate, the second retardation plate, and the polarizer are disposed in order from an object side to an image pickup element side, wherein the slow axis direction or the fast axis direction of the first retardation plate is almost parallel to a polarization direction of the polarization component extracted by the polarizer, wherein the slow axis direction or the fast axis direction of the second retardation plate is inclined by almost 45 degrees with respect to the polarization direction of the polarization component extracted by the polarizer, and wherein, when a design wavelength is $\lambda$ (nm), a phase change amount, which is a difference between a maximum value and a minimum value of the relative retardations given by the second retardation plate, is in a range from $2\lambda/5$ to $3\lambda/5$ both inclusive.

8. The image pickup apparatus according to claim 7, wherein
the relative retardations given by the second retardation plate in acquiring the plurality of images contain at least one of the maximum value and the minimum value.

9. The image pickup apparatus according to claim 7, further comprising an optical low-pass filter that includes a plurality of layers disposed between the image pickup element and the polarizer,
wherein a light separation direction caused by a layer, which is closest to the polarizer, of the optical low-pass filter is inclined by almost 45 degrees with respect to the polarization direction of the polarization component extracted by the polarizer.

10. The optical apparatus according to claim 9, wherein the optical low-pass filter uses birefringence or a polarization diffraction element.

11. The optical apparatus according to claim 7, further comprising:
an optical low-pass filter disposed between the image pickup element and the polarizer; and
a third retardation plate that gives a relative retardation of $\pi/2$ between a polarization component in a slow axis direction and polarization component in a fast axis direction, the third retardation plate being disposed between the optical low-pass filter and the polarizer,
wherein the slow axis direction or the fast axis direction of the third retardation plate is inclined by almost 45 degrees with respect to the polarization direction of the polarization component extracted by the polarizer.

12. The optical apparatus according to claim 11, wherein at least one of the first retardation plate and the third retardation plate is an achromatic retardation plate.

* * * * *